(12) United States Patent
Stanglmaier et al.

(10) Patent No.: US 6,378,489 B1
(45) Date of Patent: Apr. 30, 2002

(54) METHOD FOR CONTROLLING COMPRESSION IGNITION COMBUSTION

(76) Inventors: Rudolf H. Stanglmaier, 2658 Concan St., San Antonio, TX (US) 78251; Charles E. Roberts, Jr., 8511 Timber West, San Antonio, TX (US) 78250; Daniel W. Dickey, 10309 Rafter S. Trail, Helotes, TX (US) 78023; Thomas W. Ryan, III, 13742 Woodpoint Dr., San Antonio, TX (US) 78231; Jeffrey A. Leet, 221 County Rd. - 273, Mico, TX (US) 78056; Lee G. Dodge, 7315 Whithers La., San Antonio, TX (US) 78240; Matthew E. Schulman, 9623 Requa Rd., Helotes, TX (US) 78023

( * ) Notice: Subject to any disclaimer, the term of this patent is extended or adjusted under 35 U.S.C. 154(b) by 0 days.

(21) Appl. No.: 09/864,983

(22) Filed: May 24, 2001

(51) Int. Cl.[7] ............................................... F02M 43/00
(52) U.S. Cl. ....................................... 123/304; 123/575
(58) Field of Search .................................. 123/304, 575

(56) References Cited

U.S. PATENT DOCUMENTS

| | | | | | |
|---|---|---|---|---|---|
| 3,749,097 | A | * | 7/1973 | Grow | 123/575 |
| 3,794,000 | A | * | 2/1974 | Hodgkinson | 123/575 |
| 3,799,125 | A | * | 3/1974 | Hutchinson | 123/3 |
| 3,807,377 | A | * | 4/1974 | Hirschler, Jr. et al. | 123/575 |
| 4,002,151 | A | * | 1/1977 | Toyoda et al. | 123/3 |
| 5,357,908 | A | * | 10/1994 | Sung et al. | 123/575 |
| 5,711,270 | A | * | 1/1998 | Pedersen | 123/304 |
| 6,119,637 | A | * | 9/2000 | Matthews et al. | 123/575 |

* cited by examiner

Primary Examiner—Erick Solis
(74) Attorney, Agent, or Firm—Gunn, Lee & Keeling

(57) ABSTRACT

At least two separate fuels, having different volatility characteristics, are used to control the combustion phasing in a compression ignition engine. Desirably, the separate fuels are produced by distillation by which a parent fuel is separated into separate fractions having different reactivity. The provision multiple fuels by distillation and the control method embodying the present invention are particularly useful in controlling the combustion phasing of homogenous charge compression ignition combustion processes.

14 Claims, 2 Drawing Sheets

METHOD FOR CONTROLLING
> COMPRESSION IGNITION COMBUSTION

BACKGROUND OF THE INVENTION

1. Technical Field

This invention relates generally to a method for controlling compression ignition combustion in a compression-ignition engine, and more particularly to such a method for controlling the combustion phasing in compression ignition engines by the use of separate fuels having different volatility characteristics.

2. Background Art

Compression-ignition engines have proven to be particularly beneficial for many applications, including both vehicular as well as stationary installations. In particular, homogenous charge compression ignition (HCCI) combustion has demonstrated extremely low levels of exhaust NOx emissions and high fuel efficiency. Homogenous charge compression ignition is a combustion mode in which a homogenous air-fuel mixture starts reaction in an engine combustion chamber when the auto-ignition temperature is reached within the mixture. The reaction is initiated throughout the entire mixture, i.e., multi-point ignition, and proceeds without a visible flame front. However, control over the combustion phasing must be achieved through means other than those used in convention Diesel or spark-ignition engines.

U.S. Pat. No. 5,875,743, granted Mar. 2, 1999, to Daniel W. Dickey, one of the co-inventors of the present invention, titled APPARATUS AND METHOD FOR REDUCING EMISSIONS IN A DUAL COMBUSTION MODE DIESEL ENGINE, and assigned to the assignee of the present invention, describes the control of diesel engine emissions in a diesel engine adapted for at least partial operation in an HCCI combustion mode. U.S. Pat. No. 5,875,743 proposes the use of two fuel injectors, and optionally a water injector, for respective fuel and water injection based on engine operating parameters indicative of engine speed and load. U.S. Pat. No. 5,832,880, granted Nov. 10, 1998, also to Daniel W. Dickey, for an APPARATUS AND METHOD FOR CONTROLLING HOMOGENOUS CHARGE COMPRESSION IGNITION COMBUSTION IN DIESEL ENGINES, and likewise assigned to the assignee of the present invention, also describes controlling HCCI combustion by water injection.

More recently, U.S. patent application Ser. No. 09/738,446 was filed on Dec. 15, 2000, by Stefan Simescu, Thomas W. Ryan, III, and Daniel W. Dickey, for ENGINE AND METHOD FOR CONTROLLING HOMOGENOUS CHARGE COMPRESSION IGNITION COMBUSTION IN A DIESEL ENGINE. Thomas W. Ryan, III and Daniel W. Dickey are co-inventors of the present invention, which is likewise assigned to the assignee of the present invention. This application is directed to the control of homogenous charge compression ignition combustion by water injection into the combustion chamber subsequent to sensing an operative characteristic representative of a first combustion stage in the HCCI combustion process.

However, there remain problems in providing precise control of HCCI combustion. More particularly, controlling the HCCI combustion process has presented two significant challenges:

1) Controlling the combustion phasing with respect to the top dead center (TDC) position of a piston reciprocatively disposed in the combustion chamber, and 2) Controllably extending the operating range of HCCI combustion into high engine loads.

The present invention is directed to overcoming the problems of controlling compression ignition combustion, and particularly HCCI combustion. In particular, it is desirable to have a dual fuel system in which the two fuels have different volatility characteristics so that the combustion phasing of a compression-ignition engine can be controlled by use of the fuel having the more appropriate volatility for a specific operating condition. It is also desirable to have such a dual fuel system in which two fuels having different volatility characteristics are produced from a single multi-component parent fuel, thereby eliminating the need for separate on-board storage of two different base fuels.

SUMMARY OF THE INVENTION

In accordance with one aspect of the present invention, a method for controlling compression ignition combustion in a compression-ignition engine includes separating a single multi-component parent fuel into first and second separate fuel components, the first component having a lower volatility than the second component. At least one engine operating parameter correlative of a desired combustion phasing of the compression ignition process is sensed. Separate respective amounts of the first and second fuel components are then controllably introduced into each combustion chamber of the compression-ignition engine in response to the sensed values of the engine operating parameter.

Additional features of the present invention include separating the single multi-component parent fuel into first and second separate fuel components by distillation of at least a portion of the parent fuel. Other features include controllably introducing the separate first and second fuels, either directly into the combustion chamber or into an intake air passageway upstream of the intake valves of the engine by either a single injection nozzle having two controlled fuel passageways or through separate injectors.

In accordance with another aspect of the present invention, a method for controlling compression-ignition engine combustion in a compression-ignition engine adapted for homogenous charge compression ignition includes separating a single multi-component parent fuel into first and second separate fuel components in which the first fuel component has higher volatility characteristics than the second fuel component. At least one engine operating parameter correlative of a desired combustion phasing of the homogenous charge compression ignition process is sensed and respective separate amounts of the first and second fuels are introduced into the combustion chamber of the engine in response to the sensed engine parameter.

Yet another feature of the present invention includes the sensing of at least one engine operating parameter representative of the start of combustion of a first stage in the homogenous charge compression ignition combustion process.

BRIEF DESCRIPTION OF THE DRAWINGS

A more complete understanding of the structure and operation of the present invention may be had by reference to the following detailed description when taken in conjunction with the accompanying drawings, wherein.

DETAILED DESCRIPTION OF A PRESENTLY PREFERRED EXEMPLARY EMBODIMENT

Figure 2:
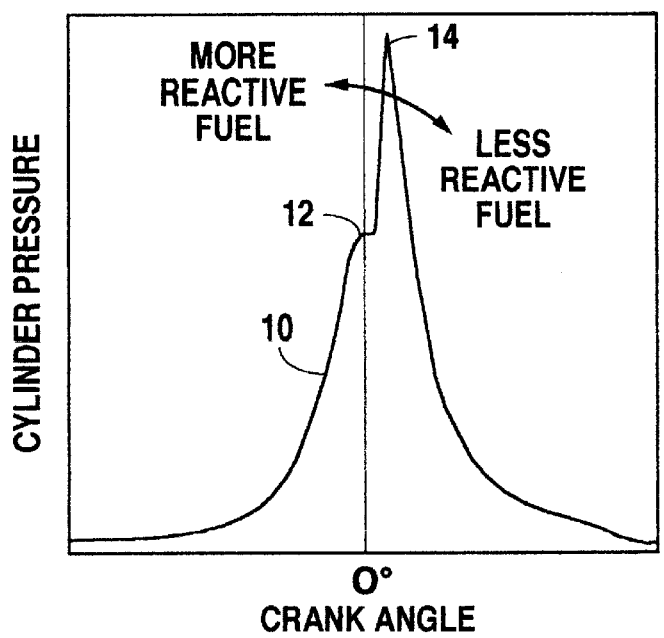
FIG. 2 is a graphical representation of cylinder pressure with respect to crank angle representing a typical auto-ignition stage in a homogenous charge compression ignition combustion process.

It has been discovered that HCCI combustion, for a typical paraffinic diesel fuel, exhibits a two-stage characteristic as represented by the graph 10 illustrated in FIG. 2. A first stage 12 of a combustion has a small energy release representing about 5% of the total fuel energy. The bulk of fuel energy is released during a second, or main, stage 14 combustion at which high rates of heat release, and accordingly rapid increases in cylinder pressure are achieved and account for approximately 95% of the total energy released. It has also been discovered that the phasing of the combustion process can either be shifted to the left or right with respect to the TDC position (0° crank angle), depending upon the relative volatility, or reactivity, of the fuel. For example, both the first stage 12 and second stage 14 of the combustion process can be shifted to the left by use of a more reactive fuel, which advances combustion, or extended to the right through the use of a less reactive fuel which retards combustion. Desirably the second stage combustion 14 occurs at or just immediately to the right of the TDC position. Thus, by the use of fuels having different reactivity, or volatility, characteristics, the phasing in the combustion process can be accordingly controlled. However, if fuels from different supply sources are provided, the requirement for on-board storage of more than a single base fuel is generally considered as a significant disadvantage by engine and fuel manufacturers. The present invention provides a means for generating two or more fuels that can be used for controlling the combustion phasing of a compression-ignition engine, and in particular an HCCI engine, from a single multi-component parent fuel.

Figure 1:
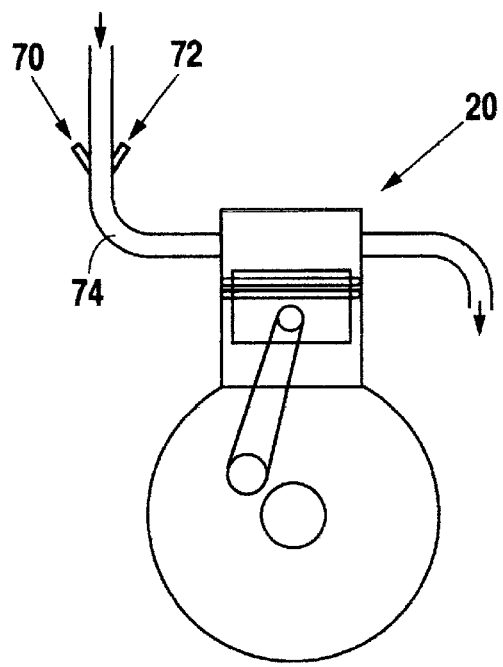
FIG. 1 is a schematic representation of a compression-ignition engine in which two fuels are introduced into the combustion chamber by way of separate injectors positioned upstream of the intake valve of a combustion chamber of the engine, in accordance with one aspect of the method embodying the present invention.
Figure 3:
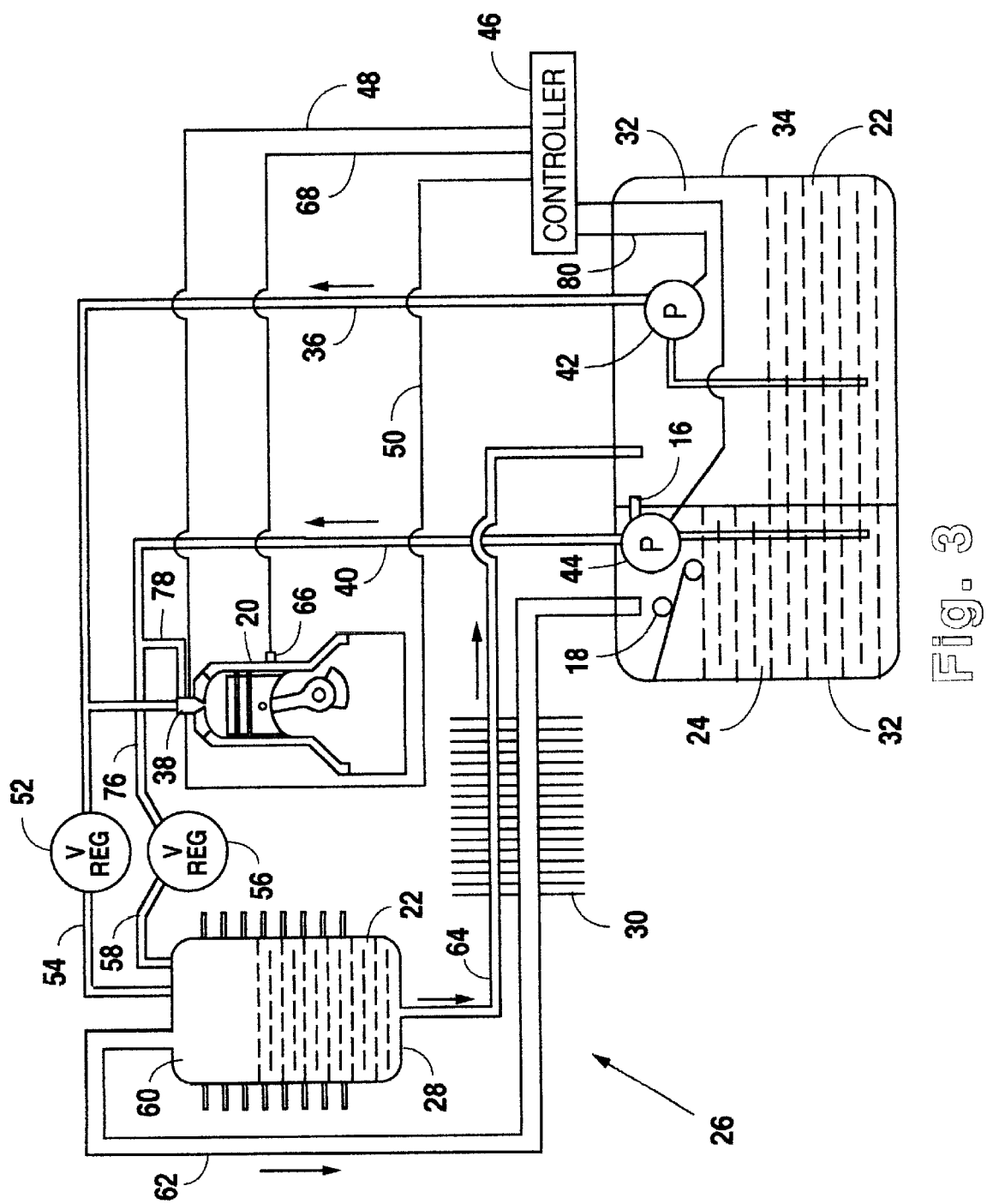
FIG. 3 is a schematic representation of an on-board fuel distillation system suitable for use in carrying out the separation of a parent fuel into dual fuel components in accordance with the present invention.

In the preferred embodiment of the present invention, a method for generating two or more fuels with different properties from a single multi-component parent fuel is illustrated in FIGS. 1 and 3. In carrying out the method embodying the present invention, two or more fuels with different properties are used to control the auto-ignition process in a compression-ignition engine 20. In particular, the auto-ignition process in the compression-ignition engine 20 is controlled by fuels having different reactivity characteristics. The reactivity of a fuel can be quantified by the Octane number, the Cetane number or any other test that relates to the ignition quality of a fuel. In the present invention, the process of distillation is used to separate fractions, or components, of a first fuel 22 according to volatility. That is, second or higher volatility component 24 of a parent fuel 22 is separated by vaporizing a portion of the parent fuel 22 and re-condensing the separated higher volatility portion 24 for separate storage and use. For some parent fuels 22, the most volatile fractions also have a lower Cetane number than the parent fuel, as described in SAE Paper No. 922229, by Ryan and Irwin, titled *Effects of Fuel Properties and Composition on the Temperature Dependent Autoignition of Diesel Fuel Fractions*. The process of distillation can be used to generate two or more fuels with different tendencies to auto-ignite, which when carrying out the method embodying the present invention, can in turn be used to control the combustion phasing of a compression-ignition engine 20.

In a preferred embodiment of the present invention, the fuel distillation process is desirably performed on a vehicle with the use of an on-board distillation system 26, as illustrated schematically in FIG. 3. Before turning to a description of the on-board distillation system 26, it should be noted that distillation could be performed outside of a vehicle in a stationary location, and then stored in separate storage containers on the vehicle.

The basic elements of the on-board distillation system 26 are an evaporator 28, a condenser 30, and a separate second tank 32 for the extracted second fuel portion 24. More specifically, with reference to FIG. 3, the on-board distillation system 26 also includes a primary fuel tank 34 in which the parent fuel 22, along with the separated lower volatility first component fuel, is stored. The primary fuel tank 34 supplies a source of primary fuel 22, e. g., conventional diesel fuel, to the engine 20. Pressurized flow of the lower volatility or parent fuel 22 is provided to an injector 38 by a first fuel supply line 36. In the illustrated embodiment, the injector 38 has separate controlled fuel flow passageways, providing a controlled dual fuel flow capability as illustrated in the above-referenced U.S. Pat. No. 5,832,880. A pressurized flow of the higher volatility fuel 24 is provided by a second supply fuel line 40 extending from the second fuel tank 32 containing the second component 24 of the distilled fuel to the fuel injector 38. The first supply fuel line 36 is pressurized by a first fuel pump 42, and the second supply fuel line 40 is pressurized by a second fuel pump 44. Control signals for respective operation of the first and second fuel flow passageways, not shown, within the injector 38 are provided by an electronic engine controller (EEC) 46, by way of electrical signals 48 and 50.

The evaporator, or vapor separator, 28 is desirably positioned on the vehicle in close proximity to the engine 20. The evaporator 28 is a combination of a fuel vaporizer and a vapor/liquid separator. Primary fuel 22 is supplied to the vapor separator 28 through a pressure regulator 52 and a first overflow fuel line 54. The pressure regulator 52 allows the first fuel pump 42 to pressurize the first fuel supply line 36 and a first fuel rail 76 for proper operation of the injector 38. Because the first fuel pump 42, controlled by an electrical signal 80 from the engine controller 46, supplies more fuel than is required by the fuel injector 38, there will be a surplus of the first fuel 22. The surplus first fuel 22 is carried away by the overflow fuel line 34 to the vapor separator 22. The second fuel pump 44 likewise pressurizes the second fuel supply line 40 and a second fuel rail 78, and provides a pressurized flow of the higher volatility second fuel 24 to the other one of the controlled internal passageways in the fuel injector 38. Surplus second fuel 24 is supplied to the vapor separator 28 through a pressure regulator 56 and an overflow fuel line 58.

The evaporator, or vapor separator, 28 heats the overflow lower volatility first fuel component 22 and the overflow higher volatility second fuel component 24 to generate a fuel vapor 60. The fuel vapor 60 is removed from the evaporator 28 by a secondary return line 62, which extends from the evaporator 28 to the secondary fuel tank 32 containing the high volatility second fuel component 24. Primary fuel 22, from which the higher volatility components or fractions have been separated, is removed from the evaporator 28 by a primary return line 64, which extends from the evaporator 28 to the primary fuel tank 34. Preferably, the evaporator 28 is heated to a temperature from about 150° Celsius to about 250° Celsius through heat exchange with the engine exhaust gases. However, the evaporator 28 may also be positioned in such close proximity with the engine 20 that it is heated to the desired temperature through direct heat exchange from the engine or exhaust gases. If desired, overflow amounts of the higher volatility second fuel 24 may be returned directly to the secondary fuel tank 32, by directing the second overflow fuel line 58 directly to the secondary fuel tank 32.

The condenser 30 cools the fuel vapor 60 to produce a supply of the higher volatility second fuel component 24. The condenser 30 is disposed in the secondary return line 62. Preferably, the condenser 30 also cools the lower volatility first fuel component 22 as it is being returned to the main or primary fuel tank 34.

Due to the distillation process, the second fuel 24 is comprised primarily of the lighter and more volative components of the primary fuel 22. These components will autoignite at a higher temperature than the heavier and less volative components of the primary fuel 22.

A vent 16 is mounted in the secondary fuel tank 32 to prevent unnecessary pressurization. A float valve 18 is also mounted in the secondary fuel tank 32 to terminate the flow of secondary fuel into the secondary fuel tank 32 when it is full, e.g., after long periods of steady state operation using the first fuel 22, and thereby prevent overflow.

The secondary fuel tank 32 stores a supply of the high volatility second fuel component 24 so that it can be supplied to the engine 20 as dictated by the engine controller 46 in accordance with the electrical signals 50. Due to the distillation process, as described above, the second fuel component 24 is comprised primarily of the lighter and more volative components of the primary fuel 22. As illustrated in FIG. 2, the injection timing of the more reactive second fuel component 24 can be controlled by the electronic engine controller 46 to inject the more volatile fuel 24, thereby retarding the initial start of combustion. The timing and duration of the less reactive first fuel component 22 can in a similar manner be controlled by the engine controller 46 by way of electrical signals 48 to advance, retard or extend the combustion process. Thus, the engine controller 46 may not only control the opening and closing of the respective fuel flow passages within the injector 38, but may also control the pulse width, or length, of the respective fuel injections.

The electronic engine controller 46 is in electrical communication with at least one sensor 66 adapted to sense at least one engine operating parameter correlative of a desired combustion phasing of the engine 20. Electrical communication between the sensor 66 and the electronic engine controller 46 is provided by an electrical signal 68 extending between the sensor 66 and the controller 46. Examples of sensors that are capable of providing a signal correlative of a desired combustion phasing include a combustion chamber pressure transducer, a sensor specifically adapted to detect the initiation of the auto-ignition process with respect to a crankshaft position, a combustion chamber intake temperature sensor, an engine temperature sensor, an engine speed sensor, and a sensor representative of engine load, such as the intake manifold pressure or output torque load sensor.

If desired, the respective first and second fuel components 22, 24 can be introduced into the engine through separate injectors 70, 72 positioned in the intake manifold 74 or other intake air duct upstream of the intake valves of the engine 20, as illustrated in FIG. 1. Alternatively, the separate fuel injectors 70, 72 may be positioned to provide respective separate direct fuel injection into the combustion chamber of the engine 20. Thus, by the present invention, two or more fuels 22, 24 can be introduced individually to the engine 20 by one or more fuel injection devices 38, 70, 72 directly into the combustion chamber of the engine 20, upstream of the intake valves, or by other commonly known carburetion devices, or by a combination of the above devices.

Thus, the present invention provides a means for generating two or more fuels that can be used for controlling the combustion phasing of a compression-ignition engine, and in particular an HCCI engine, from a single multi-component parent fuel.

INDUSTRIAL APPLICABILITY

The present invention is particularly useful for controlling the combustion phasing in compression-ignition engines, and particularly in homogenous charge compression-ignition engines with fuels having different reactivity characteristics, without the need for refueling with more than a single parent fuel. In the preferred embodiment of the present invention, the fuel distillation process is carried out on a vehicle with the use of an on-board distillation system. Moreover, the combustion control method described herein does not require costly engine actuators for variable valve actuation or variable compression ratio control systems.

Although the present invention is described in terms of preferred exemplary embodiments, those skilled in the art will recognize that changes in the illustrated embodiments may be made without departing from the spirit of the invention. For example, the parent fuel may be separated into more than two components using well-known distillation techniques and apparatus to provide three or more fuel fractions. Also, it should be recognized that the illustrated injection schemes, either directly into the cylinder with a single injector, or upstream of the intake valve by dual injectors, are presented for illustrative purposes. However, any combination of direct combustion chamber injection and upstream fuel injection may be used without departing from the spirit of the present invention. Such changes are intended to fall within the scope of the following claims. Other aspects, features, and advantages of the present invention may be obtained from a study of this disclosure and the drawings, along with the appended claims.

What we claim is:

1. A method for controlling compression ignition combustion in a compression-ignition engine, comprising:

separating a single multi-component parent fuel into at least first and second separate fuel components, said second component having a higher volatility than said first component;

sensing at least one engine operating parameter correlative of a desired combustion phasing of the compression ignition process in said engine; and, controllably introducing separate respective amounts of said first and second fuel components into a combustion chamber of said compression-ignition engine.

2. The method for controlling compression ignition combustion, as set forth in claim 1, wherein said separating a single multi-component parent fuel into at least first and second separate fuel components includes distilling at least a portion of said parent fuel.

3. The method for controlling compression ignition combustion, as set forth in claim 2, wherein said distillation of at least a portion of said parent fuel includes vaporizing said at least a portion of said parent fuel and separating said parent fuel into said separate first and second fuel components according to volatility, and subsequently re-condensing the vaporized portion of said parent fuel to form the higher volatility second fuel component.

4. The method for controlling compression ignition combustion, as set forth in claim 1, wherein said separated first and second fuel components are separately stored for subsequent controlled introduction into said engine after separation.

5. The method for controlling compression ignition combustion, as set forth in claim 1, wherein said sensing at least one engine operating parameter correlative of a desired combustion phasing of the compression ignition process in said engine includes sensing at least one engine operating parameter selected from the group consisting of combustion chamber pressure, initiation of auto-ignition with respect to a crankshaft position, combustion chamber intake temperature, engine temperature, engine speed and engine load.

6. The method for controlling compression ignition combustion, as set forth in claim 1, wherein said controllably introducing separate respective amounts of said first fuel and said second fuel components into a combustion chamber of said compression-ignition engine include separately injecting controlled amounts of said first and second fuel components directly into said combustion chamber of said compression-ignition engine.

7. The method for controlling compression ignition combustion, as set forth in claim 6, wherein said separately injecting controlled amounts of said first and second fuel components directly into said combustion chamber of said engine include injecting said first and second fuel components through a single injection nozzle having separate first and second fuel passageways.

8. The method for controlling compression ignition combustion, as set forth in claim 6, wherein said separately injecting controlled amounts of said first and second fuel components directly into said combustion chamber of said compression-ignition engine include injecting said first and second fuel components through separate injection nozzles disposed within said combustion chamber.

9. The method for controlling compression ignition combustion, as set forth in claim 1, wherein said controllably injecting separate respective amounts of said first and second fuel components into a combustion chamber of said compression-ignition engine include injecting said first and second fuel components into an intake air passageway communicating with the combustion chamber of said compression-ignition engine.

10. The method for controlling compression ignition combustion, as set forth in claim 9, wherein said separately injecting controlled amounts of said first and second fuel components into an intake air passageway includes injecting said first and second fuel components through a single injection nozzle having separate first and second fuel passageways.

11. The method for controlling compression ignition combustion, as set forth in claim 9, wherein said injecting controlled amounts of said first and second fuel components into an intake air passageway include injecting said first and second fuel components through separate injection nozzles disposed in said intake air passageway.

12. The method for controlling compression ignition combustion, as set forth in claim 1, wherein said compression-ignition engine is adapted to operate in a homogenous charge compression ignition combustion mode and said sensing at least one engine operating parameter correlative of a desired combustion phasing of the compression ignition process includes sensing a parameter representative of the start of combustion of a first stage in said homogenous charge compression ignition combustion process.

13. The method for controlling compression ignition combustion in a compression-ignition engine adapted for operation in a homogenous charge compression ignition combustion mode, comprising:

separating a single multi-component parent fuel into at least first and second separate fuel components, said second component having a higher volatility than said first component;

sensing at least one engine parameter representative of the start of combustion of a first stage in said homogenous charge compression ignition combustion process; and, controllably introducing separate respective amounts of said first and second fuel components into a combustion chamber of said compression-ignition engine.

14. The method for controlling compression ignition combustion, as set forth in claim 13, wherein said sensing a parameter representative of the start of combustion of a first stage in said homogenous charge compression ignition combustion process includes sensing at least one parameter selected from the group consisting of combustion chamber pressure, ignition of a first stage of said homogenous charge compression ignition process with respect to a crankshaft position, combustion chamber intake temperature, engine temperature, engine speed and engine load.

* * * * *